US009218162B1

(12) United States Patent
Blume et al.

(10) Patent No.: US 9,218,162 B1
(45) Date of Patent: Dec. 22, 2015

(54) CROSS-PLATFORM MOBILE APPLICATION SPECIFICATION AND AUTOMATIC SYNTHESIZER

(71) Applicants: Bill Blume, San Jose, CA (US); Jagadish Bandhole, Saratoga, CA (US); Sekaran Nanja, San Jose, CA (US); T K Lakshman, San Carlos, CA (US)

(72) Inventors: Bill Blume, San Jose, CA (US); Jagadish Bandhole, Saratoga, CA (US); Sekaran Nanja, San Jose, CA (US); T K Lakshman, San Carlos, CA (US)

(73) Assignee: MobileForce Software, Inc., Sunnyvale, CA (US)

( * ) Notice: Subject to any disclaimer, the term of this patent is extended or adjusted under 35 U.S.C. 154(b) by 0 days.

(21) Appl. No.: 14/199,517

(22) Filed: Mar. 6, 2014

Related U.S. Application Data

(60) Provisional application No. 61/773,761, filed on Mar. 6, 2013.

(51) Int. Cl.
*G06F 9/45* (2006.01)
*G06F 9/44* (2006.01)
*G06F 9/445* (2006.01)
*H04W 4/00* (2009.01)

(52) U.S. Cl.
CPC .. *G06F 8/10* (2013.01); *G06F 8/60* (2013.01); *G06F 8/41* (2013.01); *G06F 8/443* (2013.01); *H04W 4/001* (2013.01)

(58) Field of Classification Search
CPC .............. G06F 8/41; G06F 8/60; G06F 8/71; G06F 8/443; G06F 8/447; H04W 4/001
USPC ........................................................ 717/151
See application file for complete search history.

(56) References Cited

U.S. PATENT DOCUMENTS

| 8,910,115 | B2 * | 12/2014 | Reddy et al. ................... 717/106 |
| 2006/0129972 | A1 * | 6/2006 | Tyburski et al. ............... 717/106 |
| 2009/0313004 | A1 * | 12/2009 | Levi et al. ......................... 703/28 |
| 2010/0318958 | A1 | 12/2010 | Kuester et al. |
| 2011/0154305 | A1 * | 6/2011 | LeRoux et al. ................ 717/140 |
| 2011/0161912 | A1 | 6/2011 | Eteminan et al. |
| 2011/0209128 | A1 * | 8/2011 | Nikara et al. .................. 717/140 |
| 2011/0258595 | A1 * | 10/2011 | Clevenger ...................... 717/106 |
| 2012/0089733 | A1 * | 4/2012 | Luh et al. ....................... 709/225 |
| 2012/0144384 | A1 | 6/2012 | Baek |
| 2014/0372518 | A1 * | 12/2014 | Moore et al. ................... 709/203 |

OTHER PUBLICATIONS

IBM et al., "A Method to Handle Fragmentation of Platform Interfaces for Mobile Applications," IPCOM000185355D, ip.com, Jul. 2009, 4pg.*

* cited by examiner

*Primary Examiner* — Ryan Coyer
(74) *Attorney, Agent, or Firm* — Carr & Ferrell LLP

(57) ABSTRACT

A method for synthesizing mobile applications is provided. The method includes receiving a mobile application specification and compiling a first native mobile application based at least in part on the mobile application specification. A second native mobile application is then compiled based at least in part on the mobile application specification. The first native mobile application is sent to a first client device. The first native mobile application is specific to the first client device and the first native mobile application is capable of being executed by the first client device. The second native mobile application is sent to a second client device, the second native mobile application being specific to the second client device and the second native mobile application is capable of being executed by the second client device.

16 Claims, 4 Drawing Sheets

CROSS-PLATFORM MOBILE APPLICATION SPECIFICATION AND AUTOMATIC SYNTHESIZER

CROSS-REFERENCE TO RELATED APPLICATIONS

This application claims the benefit of U.S. Provisional Patent Application Ser. No. 61/773,761, filed on Mar. 6, 2013, entitled "Cross Platform Native Mobile UI Specification & Automatic Synthesizer," which is incorporated herein by reference in its entirety for all purposes.

TECHNICAL FIELD

This disclosure relates generally to data processing and, more specifically, to automatically synthesizing native smartphone and tablet software applications for devices with different platforms based on a unified specification language.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Currently, portable handheld devices such as smartphones, tablet computers, and other devices are in wide use around the world. Many individuals carry such devices and use them for a variety of functions. These devices can enable both cellular and Wi-Fi® communications and provide users with the ability to access content almost instantaneously. In particular, these devices can run application software, also known as a "mobile application," a "mobile app," or simply an "app," which facilitate user access to various functionalities of these devices, or content stored on these devices or a remote server.

Mobile applications were originally intended for general productivity increase and information retrieval. Such applications provided email, calendars, contacts, and weather information. However, public demand and the availability of developer tools have driven rapid expansion of mobile applications into other categories such as mobile games, navigation and location-based services, banking, order-tracking, fitness related monitoring and tracking, ticket purchases, and others. Mobile applications are usually available through application distribution platforms, such as Apple App Store®, Google Play®, Windows Phone Store®, and Blackberry App World®, which correspond to operating systems installed on mobile devices such as an iPhone®, an Android® phone, a Windows Phone®, and a Blackberry®.

The diversity of these devices can present a challenge to producers who want to develop content for as wide an audience as possible, because the mobile devices have different operating systems (OS) and require different versions of mobile applications to be written for different platforms. In other words, software developers need to create hardware/OS platform specific mobile applications for each type of mobile device, with similar look, same functionality, and ability to access the same content. For example, a software developer should use Objective C language to create a native mobile application for iOS® devices (e.g., iPhone®), Java® to create a native mobile application for Android® devices, and .NET® language for Windows® phones. This approach results in different applications, which are not portable across other OS platforms.

Web-based applications can be used to address portability issues. Web applications can be designed using HTML5 (HyperText Markup Language 5), CSS (Cascading Style Sheets), and/or Javascript® and other scripting technologies such as Ruby®, which are often hardware/OS platform independent as they can be run with a web browser. Web applications can enable software developers to create a single application suitable for all major OS platforms. Existing libraries such as jQuery Mobile®, Sencha Touch®, or similar can also be used to make this task easier on the client/browser side, whereas on the server side there are yet more choices of scripting languages such as PHP, .NET, Perl®, Python®, Ruby® and other languages supported by means of Simple Object Access Protocol (SOAP) or Representational state transfer (REST) protocols. However, web applications do not provide the ease of use and the look and feel of native mobile applications, nor can they leverage and keep up with rapidly changing core functionalities of the device such as speech input, Global Positioning System (GPS), camera, and operating systems.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present technology provides for automatic synthesis of native mobile applications for mobile devices of different hardware/OS platforms based on a single mobile application specification. The present technology provides for a server-based platform independent from declarative mobile application languages. The present technology further provides a cloud implementation of the mobile application specification together with a unique user interface (UI) for administration and management of the mobile application specification. The present technology further enables implementing native mobile applications on client devices so that they are able to read or address the mobile application specification at run time and provide a corresponding flexible native graphical user interface (GUI) and workflow, which is uniform across mobile OS platforms. In addition, the present technology provides an administration interface for administering and managing not only mobile application specifications maintained by one or more servers, but also administrating and managing native mobile applications on the client side. The administration interface can also provide tracking of, and analytics associated with, mobile application usage.

According to one example embodiment of the present disclosure, there is provided a method for synthesizing mobile applications. The method is implemented by means of a computing device comprising one or more processors, one or more memories, and one or more communication interfaces. One example device includes a server, and another example device includes a distributed computing approach involving multiple interconnected computing devices, such as servers. The method can include receiving and/or maintaining a mobile application specification, compiling a first native mobile application based at least on the mobile application specification, and compiling a second native mobile application based at least on the mobile application specification, wherein the second native mobile application differs from the first native mobile application. The method can further include sending the first native mobile application to a first client device, wherein the first native mobile application is specific to the first client device, and the first native mobile application is capable of being executed by the first client device. The method further includes sending the second native mobile application to a second client device, wherein the second native mobile application is specific to the second client device, and the second native mobile application is capable of being executed by the second client device. In certain embodiments, the method may further include compiling a third native mobile application based at least in part on the mobile application specification, wherein the third native mobile application differs from the first native mobile application and the second native mobile application, and sending the third native mobile application to a third client device, wherein the third native mobile application is specific to the third client device, and the third native mobile application is capable of being executed by the third client device. Notably, the first client device includes a first operational software platform, the second client device includes a second operating software platform, and the second operational software platform differs from the first operating software platform. The third client device includes a third operational software platform and the third operational software platform differs from both the first and second operational software platforms. In certain embodiments, each of the client devices may have different characteristics such as dimensions or other feature differences. In certain embodiments, the first native mobile application is capable of providing a unified GUI for displaying by the first client device, and the second native mobile application is capable of providing the unified GUI for displaying by the second client device. The multiple native mobile applications on different client devices can communicate with a single server and also with one another.

In certain embodiments, the mobile application specification includes application content and multiple application instruction elements. The multiple application instruction elements include one or more mobile application applets. In some examples, the multiple application instruction elements include one or more GUI elements. In some examples, the multiple application instruction elements include one or more data elements for displaying via a GUI. In some embodiments, at least one of the data elements is associated with a remote online service. Furthermore, in some embodiments, at least one of the data elements is configured to acquire specific content from the remote online service (based on the mobile application specification) and display the specific content on the first client device and the second client device.

In certain embodiments, the method further includes providing a management interface. The management interface can enable a user to manage a workflow of the first native mobile application and the second native mobile application. In addition, in some embodiments, the management interface can enable a user to manage a lifecycle of the first native mobile application and the second native mobile application. In further example embodiments, the management interface is configured to track and monitor usage of the first native mobile application and the second native mobile application. In yet further example embodiments, the management interface is configured to manage the mobile application specification distributed over multiple servers.

In further example embodiments, steps of method(s) described herein may be stored on a computer readable storage medium having a program embodied thereon, with the program executable by a processor in a computing device. In yet further exemplary embodiments, modules, systems, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements.

DETAILED DESCRIPTION

Figure 1:
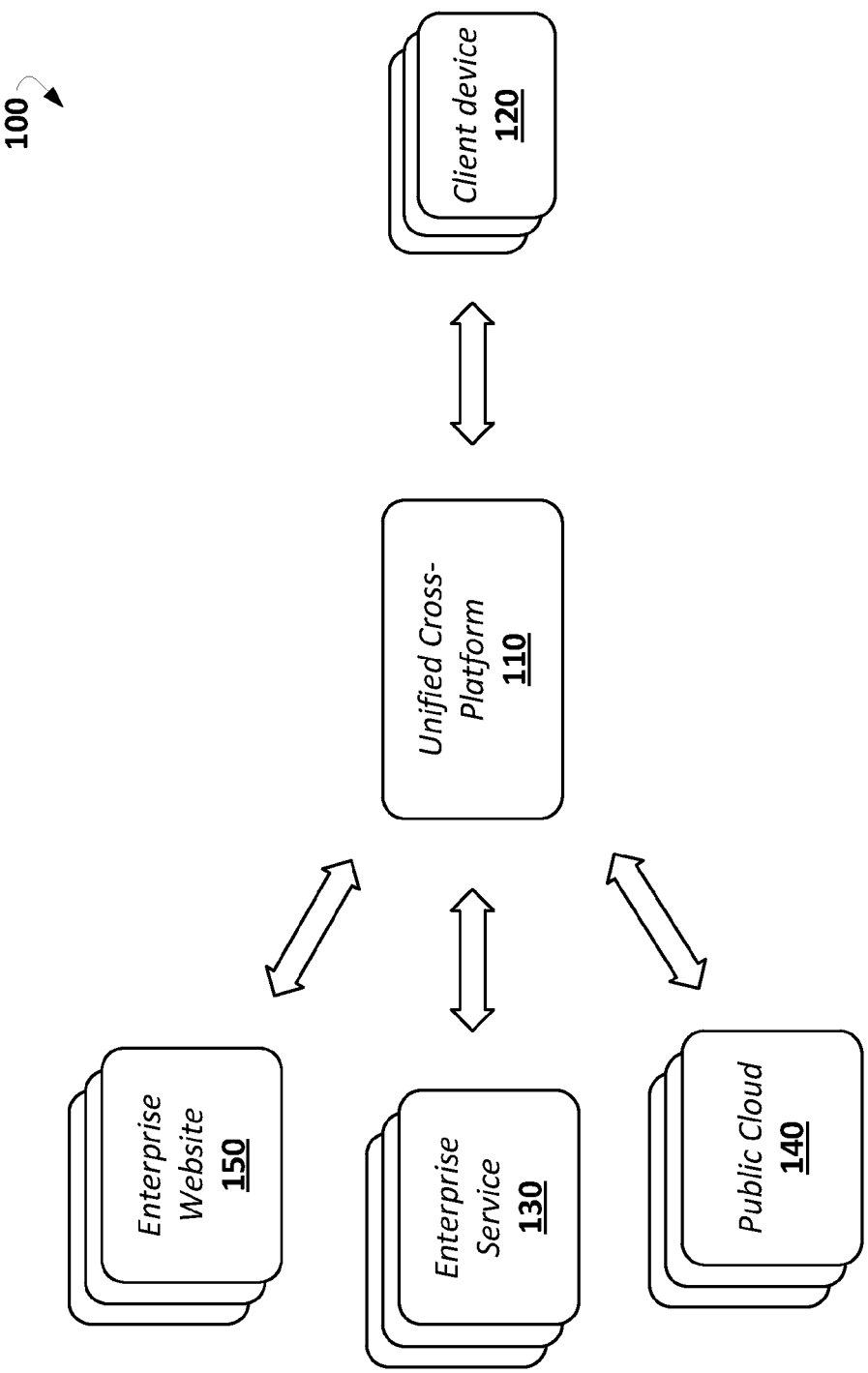
FIG. 1 shows a high-level block diagram illustrating a system environment suitable for implementing methods for synthesizing native mobile applications.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

As outlined above, embodiments of the present disclosure provide systems and methods for synthesizing native mobile applications for various types of client devices running different OSs and having different hardware components and functionalities. The term "client device," as used in the present disclosure, refers to a wide range of portable computing devices such as cellular telephones, smartphones, tablet computers, laptop computers, personal digital assistants (PDAs), music players, and so forth. Some examples of client devices include an iPhone®, Android® phone, Windows Phone®, and BlackBerry®.

The synthesis of native mobile applications for the different client devices is based on a mobile application specification (i.e., a unified language that can be created by users, for example, through a web platform). The platform enables users to quickly specify, rather than create code, mobile application specifications stipulating mobile application graphical interface, functionality, integration, communication with hardware components and web services, and so forth. The platform may embed a graphical console for non-professional developers to easily construct mobile application specifications for customized mobile applications. The platform can also employ an engine or a synthesizer that can be configured to convert the mobile application specification into a code for one or more native mobile applications. The native mobile applications can be deployed on various client devices having different OS platforms, hardware, and functionalities. Notably, native mobile applications created based on a single mobile application specification provide substantially the same graphical interface and functionalities regardless of the hardware or OS platform of the client devices. The platform can also enable automatic maintenance of the entire native mobile application lifecycle including packaging native mobile applications, delivery, deployment, hosting, use, management, access-control, update, and upgrade, as well as usage tracking and analytics. These and other embodiments of the present disclosure are further described with reference to the figures of the drawings.

FIG. 1 shows a high-level system environment 100 suitable for implementing methods for synthesizing native mobile applications, according to an example embodiment of the present disclosure. The environment 100 includes a unified cross-platform 110 ("platform"), which enables, inter alia, implementation of the methods for synthesizing native mobile applications based on mobile application specifications as described herein. The platform 110 may be an integral part of a web server, which may optionally provide cloud mobile services. Mobile cloud services are a discrete set of high-value middleware capabilities designed to be consumed by mobile applications. Mobile cloud services complement the platform 110 and help accelerate and enrich mobile application development. The mobile cloud services may also provide platform-agnostic mobile application development and facilitate development via software development kits (SDKs).

In certain embodiments, the platform 110 is a standards compliant open platform including, for example, REST web-services, Application Programming Interface (API) enabling integration features, extensible widgets for rapid mobile application development, and a personalization engine for delivering specific content and native mobile applications to selected client devices based on predetermined rules and criteria. Accordingly, the platform 110 communicates with one or more client devices 120 and a number of web resources and services 130-150 via one or more communication networks. Namely, the client devices 120 include, for example, smartphones or tablet computers that may install and run native mobile applications such as native mobile applications synthesized by the platform 110.

The platform 110 may also communicate with one or more enterprise websites 130 bearing specific content or functionalities. Similarly, the platform 110 may also communicate with one or more enterprise websites 150 such as web services (such as REST-compliant web services enabling to manipulate XML (Extensible Markup Language) representations to the client devices 120 or arbitrary web services exposing arbitrary operations or processes). The term "enterprise" is used to the designate that the web services and content to be delivered to the client devices 120 is private and may possess commercial purposes. The platform 110 may also communicate with one or more public clouds 140 implementing "cloud computing" model for online services, such as storage of content or software applications, available to the general public.

Accordingly, the platform 110 integrates data across multiple mobile applications using cloud computing technology in order to minimize the number of tools needed for mobile application developers or owners. The platform 110 enables its users to create, host, deliver, and personalize mobile applications independent of hardware or OS of target client devices 120, as well as support content transactions and monitoring of mobile application activities.

As outlined above, the platform 110 enables its users to create mobile application specifications. For these ends, there is no need for the users to write the specification using a programming language. Instead, the users may use a graphical console of the platform 110 to design and create mobile application specifications, which can be further synthesized "on-the-fly" into selected native mobile applications and delivered to the client devices 120.

In general, the graphical console of the platform 110 enables its users to quickly create customized and branded native mobile applications, because the console provides a compositional, zero-programming approach to creating the mobile application specification. For example, there may be provided drag-and-drop elements, customizable buttons, graphical or screen elements, and other features that can be used by non-professional developers. The console may also employ built-in templates, widgets, and integration plug-ins that non-programmers may intuitively use to build native mobile applications and deploy them across all popular client device platforms. In addition, professional programmers may take advantage of this approach to start building native mobile applications and seamlessly extend their functionalities by simply adding their custom coded components through the platform's plug-in architecture.

Figure 2:
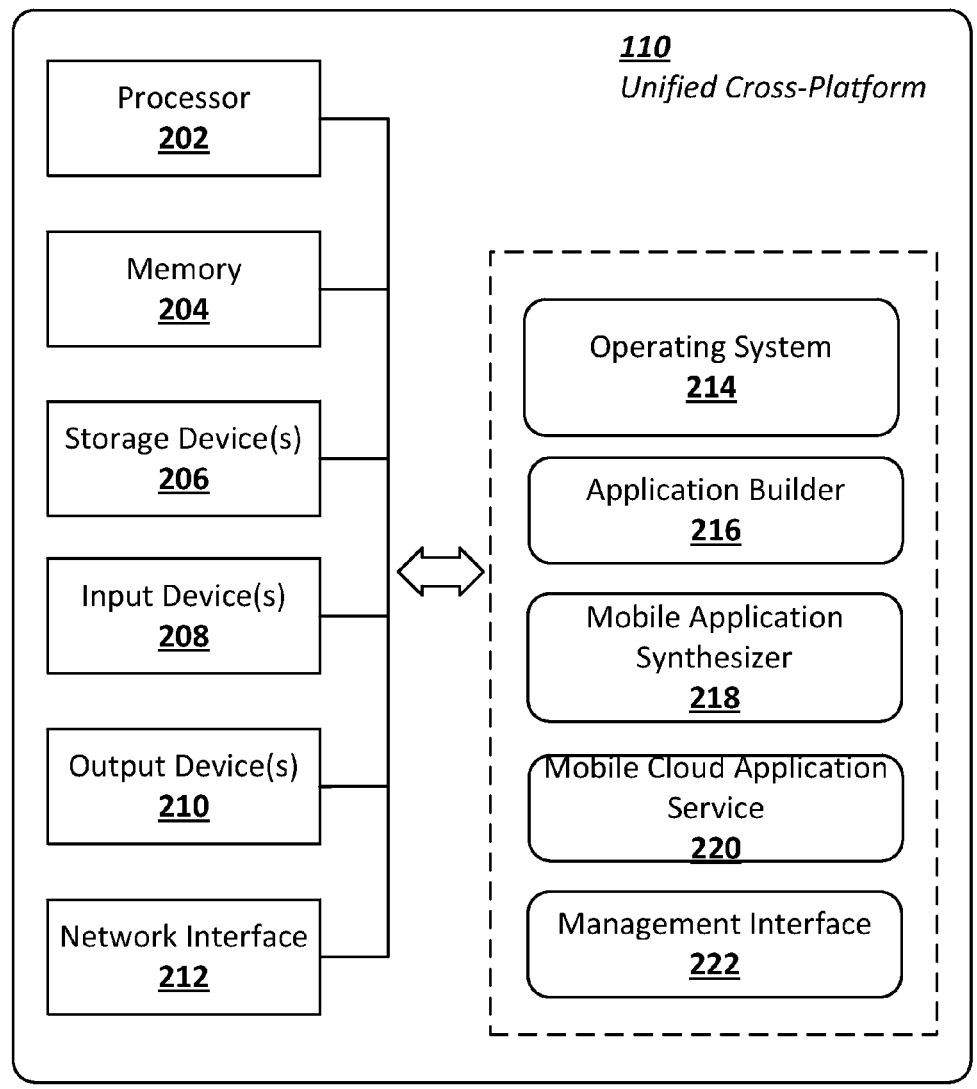
FIG. 2 is a high-level block diagram illustrating an example platform.

FIG. 2 is a high-level block diagram illustrating an example platform 110 suitable for implementing the methods described herein. In particular, the platform 110 may be used for creating mobile application specifications, synthesizing native mobile applications based on the mobile application specifications, deploying the native mobile applications across multiple client devices 120, monitoring workflow and lifecycle of the native mobile applications, and so forth.

The platform 110 may be, include, or be an integral part of one or more of a variety of types of devices and systems such as a general-purpose computer, desktop computer, server, computer network, network service, cloud computing service, and so forth.

As shown in FIG. 2, the platform 110 includes one or more processors 202, a memory 204, one or more storage devices 206, one or more optional input devices 208, one or more optional output devices 210, and a network interface 212. The one or more processors 202 are, in some examples, configured to implement functionality and/or process instructions for execution within the platform 110. For example, the processors 202 may process instructions stored in memory 204 and/or instructions stored on storage devices 206. Such instructions may include components of an operating system 214 or software applications 216-222. Platform 110 may also include one or more additional components not shown in FIG. 2, such as a housing, power supply, communication bus, and so forth.

Memory 204, according to one example, is configured to store information within the platform 110 during operation. Memory 204, in some example embodiments, may refer to a non-transitory computer-readable storage medium or a computer-readable storage device. In some examples, memory 204 is a temporary memory, meaning that a primary purpose of memory 204 may not be long-term storage. Memory 204 may also refer to a volatile memory, meaning that memory 204 does not maintain stored contents when memory 204 is not receiving power. Examples of volatile memories include random access memories (RAM), dynamic random access memories (DRAM), static random access memories (SRAM), and other forms of volatile memories known in the art. In some examples, memory 204 is used to store program instructions for execution by the processors 202. Memory 204, in one example, is used by software (e.g., the operating system 214) or applications 216-222, such as a software, firmware, or middleware for synthesis of native mobile applications executing on platform 110 to temporarily store information during program execution. One or more storage devices 206 can also include one or more transitory or non-transitory computer-readable storage media and/or computer-readable storage devices. In some embodiments, storage devices 206 may be configured to store greater amounts of information than memory 204. Storage devices 206 may further be configured for long-term storage of information. In some examples, storage devices 206 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 2, the platform 110 may optionally include one or more input devices 208. The input devices 208 may be configured to receive input from users. Examples of input devices 208 may include a keyboard, keypad, mouse, trackball, touchscreen, touchpad, or any other device capable of detecting an input from a user or other source, and relaying the input to platform 110, or components thereof. In some examples, the optional output devices 210 are configured to provide output to users through visual or auditory channels. Output devices 210 may include a video graphics adapter card, a liquid crystal display (LCD) monitor, a light emitting diode (LED) monitor, a sound card, a speaker, or any other device capable of generating output that may be intelligible to a user.

The platform 110, in some example embodiments, includes network interface 212. The network interface 212 can be utilized to communicate with external devices via one or more networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. The network interface 212 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB.

The operating system 214 may control one or more functionalities of platform 110 and/or components thereof. For example, the operating system 214 may interact with the applications 216-222, and may facilitate one or more interactions between applications 216-222 and one or more of processors 202, memory 204, storage devices 206, input devices 208, and output devices 210. As shown in FIG. 2, the operating system 214 may interact with or be otherwise coupled to the applications 216-222 and components thereof. In some embodiments, applications 216-222 may be included in operating system 214.

Still referencing to FIG. 2, the software applications 216-222 include an application builder 216, mobile application synthesizer 218, mobile cloud application service 220, and management interface 222. More particularly, the application builder 216 enables the platform users to create mobile application specifications in an easy manner. The users may use drag-and-drop functionality to specify mobile application elements, content, and interaction therebetween and with other web services. The users may specify mobile application presentation, workflow, and integration. Furthermore, the application builder 216 may include mobile optimized modules, built-in widgets, and third party integration plug-ins.

The mobile application synthesizer 218 enables an automatic compile or construct of native mobile applications based on mobile application specifications created with the help of application builder 216. The mobile application synthesizer 218 creates multiple mobile applications for a variety of devices or OS platforms based on a single mobile application specification. The mobile application synthesizer 218 may also facilitate sending the native mobile applications to selected client devices 120, as well as their installation and deployment.

The mobile cloud application service 220 may provide a number of various web services such as security, role-based access, search, meta-data repository, analytics, cloud-enabled data store, and many more. This may be helpful not only for creation of the native mobile applications, but also for their operation on client devices 120.

The management interface 222 provides a great number of tools and mechanisms for controlling native mobile applications, their deployment and usage; controlling content; providing poly management; reporting; and so forth. More specifically, the management interface 222 enables users to manage a workflow and life cycle of multiple native mobile applications, track and monitor usage of multiple native mobile applications, manage mobile application specifications distributed over multiple servers, and so forth.

Figure 3:
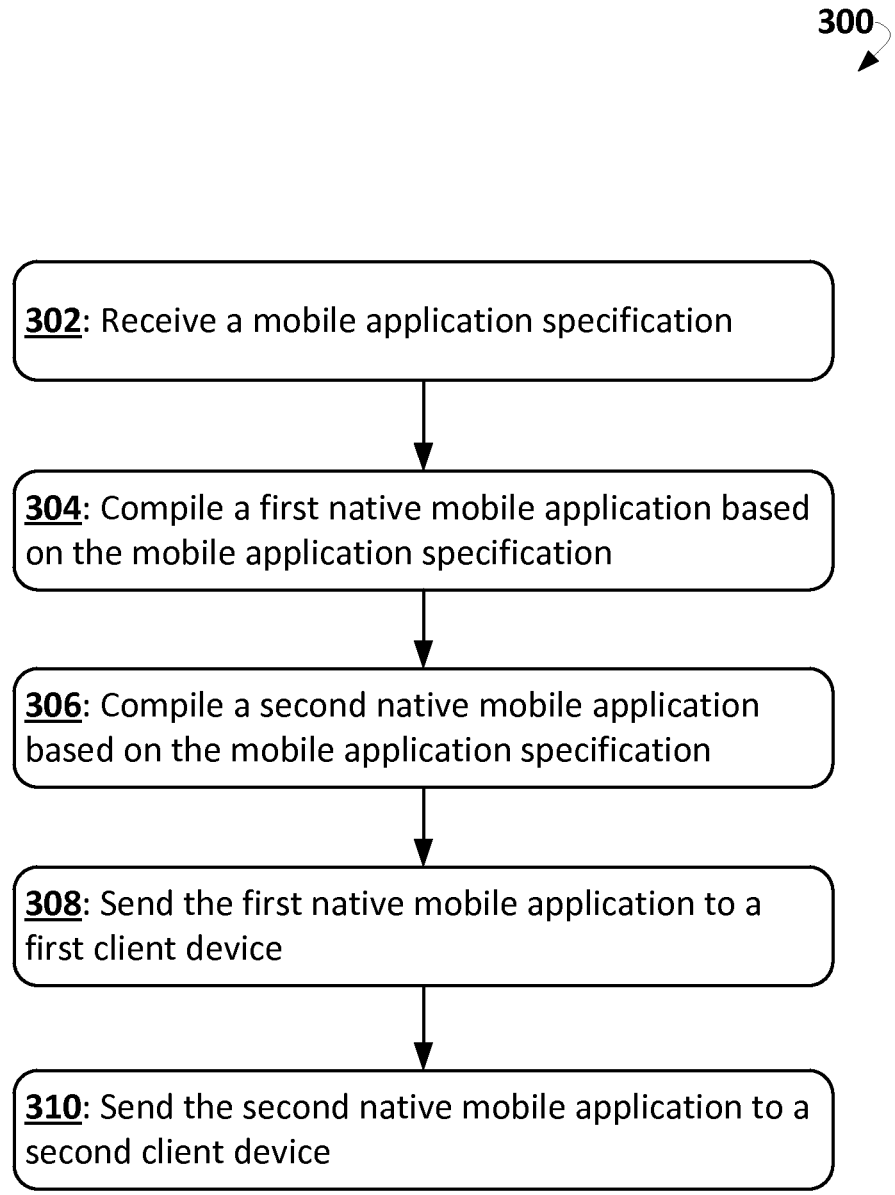
FIG. 3 shows a high-level process flow diagram of a method for synthesizing mobile applications.

FIG. 3 shows a high-level process flow diagram of a method 300 for synthesizing mobile applications, according to one exemplary embodiment. The method 300 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 300 is implemented by the platform 110 shown in FIGS. 1 and 2; however, it should be appreciated that the method 300 is just one example operation of the platform 110. In addition, the below recited steps of the method 300 may be implemented in an order different than described and shown in FIG. 3. Moreover, the method 300 may have additional steps not shown herein, but which can be evident for those skilled in the art from the present disclosure. The method 300 may also have fewer steps than outlined below and shown in FIG. 3.

The method 300 commences at step 302 with the platform 110 and, more specifically, the mobile application synthesizer 218, receiving a mobile application specification as created by a user using the application builder 216. At step 304, the mobile application synthesizer 218 compiles or constructs a first native mobile application based on the mobile application specification. Similarly, at step 306, the mobile application synthesizer 218 compiles or constructs a second native mobile application based on the same mobile application specification. Notably, the mobile application synthesizer 218 can compile as many native mobile applications specific to certain hardware/OS platforms as needed.

At step 308, the mobile application synthesizer 218 sends the first native mobile application to a first client device 120, and at step 310, the mobile application synthesizer 218 sends the second native mobile application to a second client device, which is different from the first client device 120 and has a different OS and/or hardware than the first client device 120. These operations may be repeated as much as needed, and notably, the GUIs and functionalities of the first and second native mobile applications substantially coincide with each other. In other words, every mobile application created by the mobile application synthesizer 218 based on one mobile application specification provides a unified GUI and substantially the same functionalities regardless of the hardware or OS platform of the client devices 120.

It should be understood that a mobile application specification abstracts away native user interface components from native mobile application using "screen" constructs, each of which can be associated with various rules, instructions and content to make the application rich and enable control flow.

Below is shown a portion of exemplary mobile application specification given for illustration purposes:

```
<app name="..." revision="1.0">
    <data>
        <prop key="cloud-account..">cloud-zone</prop>
        ........
    </data>
    <applet    name="appl"    imageurl=".."    admin=".."
acl="access-control-settings">
        <data>
            <prop         key="Enterprise          Service
Name">SvcURL</prop>
            ........
        </data>
        <intro type="web" url=".." ../>
        <screens type="grid" title=".." captions="..">
            <screen type="tabs" name=".." icon=".." acl="..">
                <tabs>
                    <tab type="tree" .../>
                    <tab type="list" ../>
                    ...
                </tabs>
            </screen>
            <screen type="search" name=".." icon=".." acl=".."/>
            <screen type="
        </screens>
    </applet>
    <applet    name="app2"    imageurl=".."    admin=".."
acl="access-control-settings">
    </applet>
    ......
</app>
```

The "type" tag, as shown above, abstracts native user interface elements which are either directly mapped to underlying device SDKs (if natively available) or to library functions (if not natively available). The icons and URLs (uniform resource locators) in the above example represent cloud resources that can be synthesized directly into native mobile applications. Furthermore, the mobile application specification enables the native mobile application to automatically synthesize its native user interface dynamically, upon startup, directly from this specification.

Notably, the mobile application specification comprises application content and application instruction elements. The application content may either be internal or external (i.e., retrieved from public cloud or other web resources). Application instruction elements may include tags, application applets, widgets, graphical user interface elements, and so forth. The applets represented in the mobile application specification may provide different user interface starting points for the mobile application, or may "modularize" different aspects of enterprise products, solutions to be sold, or distinct workflow activities such as "product selling," "account management," "expense reporting," "visualization," and so forth.

Referring back to the mobile application specification example shown above, there are a number of "screen" elements. These elements represent initial user interfaces to be shown to the users of client devices 120. In the example above, the "screen" elements specify a "grid" layout consisting of multiple actionable "buttons" each represented as a "screen" element.

The "data" section of an applet, as shown in the example above, represents enterprise services such as "enterprise communities," "Knowledge bases," and "CRM/SFA systems" for which the integration plug-ins and authentication credentials may reside on one or more cloud services.

Figure 4:
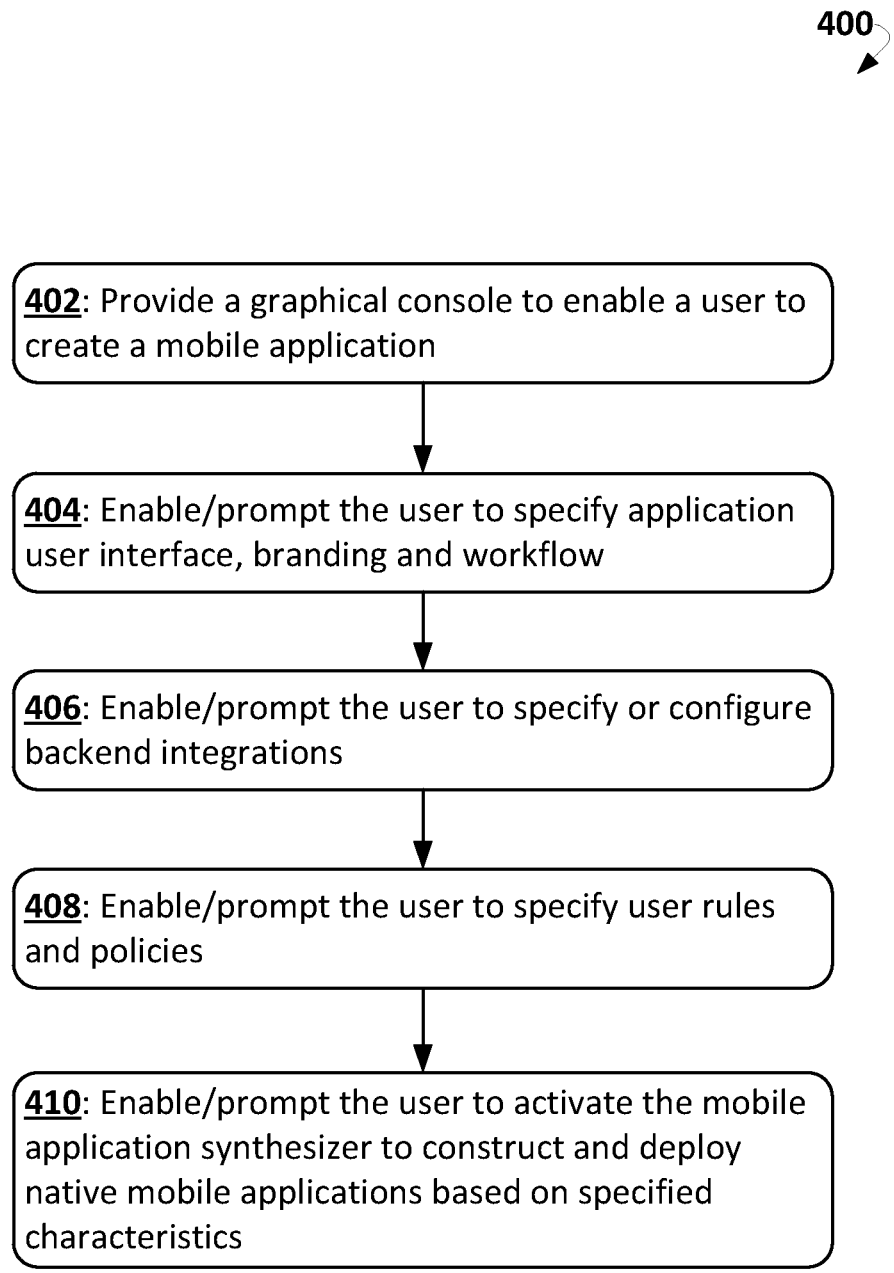
FIG. 4 shows a high-level process flow diagram of a method for creating a mobile application specification

FIG. 4 shows a high-level process flow diagram of a method 400 for creating a mobile application specification, according to one exemplary embodiment. The method 400 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 400 is implemented by the platform 110 shown in FIGS. 1 and 2; however, it should be appreciated that the method 400 is just one example operation of the platform 110. In addition, the below recited steps of the method 400 may be implemented in an order different than described and shown in FIG. 4. Moreover, the method 400 may have additional steps not shown herein, but which can be evident for those skilled in the art from the present disclosure. The method 400 may also have fewer steps than outlined below and shown in FIG. 4.

The method 400 commences at step 402 with the application builder 216 of the platform 110 providing a graphical console for a user to create a mobile application specification. At step 404, the application builder 216 enables or prompts the user to specify an application user interface, branding, and workflow in association with the mobile application specification. At step 406, the application builder 216 enables or prompts the user to specify or configure backend integrations in association with the mobile application specification. At step 408, the application builder 216 enables or prompts the user to specify user policies and rules in association with the mobile application specification. At step 410, the application builder 216 enables or prompts the user to activate the mobile application synthesizer 218 to automatically construct and deploy native mobile applications based on the mobile application specification.

Thus, systems and methods for synthesizing native mobile applications have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for synthesizing mobile applications, the method comprising:
    receiving, by a computing device comprising one or more processors and a memory, a mobile application specification, the mobile application specification comprising:
        an application content; and
        multiple application instruction elements comprising one or more data elements for displaying via a graphical user interface (GUI), in which at least one of the one or more data elements is associated with a remote online service and is configured to acquire specific content from the remote online service and display the specific content on a first client device and a second client device;

compiling, by the computing device, a first native mobile application based at least in part on the mobile application specification;

compiling, by the computing device, a second native mobile application based at least in part on the mobile application specification, the second native mobile application being different from the first native mobile application;

sending, by the computing device, the first native mobile application to the first client device, wherein the first native mobile application is specific to the first client device and the first native mobile application is capable of being executed by the first client device; and sending, by the computing device, the second native mobile application to the second client device, wherein the second native mobile application is specific to the second client device and the second native mobile application is capable of being executed by the second client device.

2. The method of claim 1, further comprising:

compiling, by the computing device, a third native mobile application based at least in part on the mobile application specification, the third native mobile application being different from the first native mobile application and the second native mobile application; and sending, by the computing device, the third native mobile application to a third client device, wherein the third native mobile application is specific to the third client device and the third native mobile application is capable of being executed by the third client device.

3. The method of claim 2, wherein the first client device comprises a first operational software platform, the second client device comprises a second operational software platform, and the second operational software platform differs from the first operational software platform.

4. The method of claim 2, wherein the third client device comprises a third operational software platform and the third operational software platform differs from the first operational software platform and the second operational software platform.

5. The method of claim 1, wherein:
the first native mobile application is capable of providing a unified GUI for displaying by the first client device; and
the second native mobile application is capable of providing the unified GUI for displaying by the second client device.

6. The method of claim 1, wherein the multiple application instruction elements comprise one or more mobile application applets.

7. The method of claim 1, wherein the multiple application instruction elements comprise one or more GUI elements.

8. The method of claim 1, further comprising providing, by the computing device, a management interface.

9. The method of claim 8, wherein the management interface enables a user to manage a workflow of the first native mobile application and the second native mobile application.

10. The method of claim 8, wherein the management interface enables a user to manage a lifecycle of the first native mobile application and the second native mobile application.

11. The method of claim 8, wherein the management interface is configured to track and monitor usage of the first native mobile application and the second native mobile application.

12. The method of claim 8, wherein the management interface is configured to manage the mobile application specification being distributed over multiple servers.

13. A system for synthesizing mobile applications, the system comprising:

a server comprising one or more processors and a memory, the server being in communication with one or more client devices and one or more content production services, wherein the memory maintains a mobile application specification, the mobile application specification comprising:

an application content; and multiple application instruction elements comprising one or more data elements for displaying via a graphical user interface (GUI), in which at least one of the one or more data elements is associated with a remote online service and is configured to acquire specific content from the remote online service and display the specific content on a first client device and a second client device;

and the one or more processors are configured to:

compile a first native mobile application based at least in part on the mobile application specification;

compile a second native mobile application based at least in part on the mobile application specification, the second native mobile application being different from the first native mobile application;

send the first native mobile application to the first client device, wherein the first native mobile application is specific to the first client device and the first native mobile application is capable of being executed by the first client device;

send the second native mobile application to the second client device, wherein the second native mobile application is specific to the second client device and the second native mobile application is capable of being executed by the second client device; and wherein the first native mobile application and the second native mobile application are configured to acquire content from the one or more production services based at least in part on the mobile application specification and to provide substantially the same unified GUI.

14. The system of claim 13, wherein the first native mobile application and the second native mobile application are compiled based on multiple application instruction elements contained in the mobile application specification.

15. The system of claim 13, wherein the first client device comprises a first operational software platform, the second client device comprises a second operational software platform, and the first operational software platform differs from the first operational software platform.

16. A non-transitory processor-readable medium having instructions stored thereon, which when executed by one or more processors, cause the one or more processors to implement a method for synthesizing mobile applications, the method comprising:

receiving a mobile application specification, the mobile application specification comprising:

an application content; and multiple application instruction elements comprising one or more data elements for displaying via a graphical user interface (GUI), in which at least one of the one or more data elements is associated with a remote online service and is configured to acquire specific content from the remote online service and display the specific content on a first client device and a second client device;

compiling a first native mobile application based at least in part on the mobile application specification;

compiling a second native mobile application based at least in part on the mobile application specification, the second native mobile application being different from the first native mobile application;

sending the first native mobile application to the first client device, wherein the first native mobile application is specific to the first client device and the first native mobile application is capable of being executed by the first client device; and sending the second native mobile application to the second client device, wherein the second native mobile application is specific to the second client device and the second native mobile application is capable of being executed by the second client device.

* * * * *